United States Patent
Kwon (10) Patent No.: US 12,128,847 B2
(45) Date of Patent: Oct. 29, 2024

(54) ROOF AIRBAG AND ROOF AIRBAG DEVICE HAVING THE SAME

(71) Applicant: HYUNDAI MOBIS CO., LTD., Seoul (KR)

(72) Inventor: Oh Koang Kwon, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/350,150

(22) Filed: Jul. 11, 2023

(65) Prior Publication Data

US 2024/0010155 A1    Jan. 11, 2024

(30) Foreign Application Priority Data

Jul. 11, 2022   (KR) .......................... 10-2022-0084770

(51) Int. Cl.
*B60R 21/214*    (2011.01)
*B60R 21/231*    (2011.01)

(52) U.S. Cl.
CPC .......... *B60R 21/214* (2013.01); *B60R 21/231* (2013.01); *B60R 2021/23107* (2013.01)

(58) Field of Classification Search
CPC ................ B60R 21/214; B60R 21/231; B60R 2021/23107; B60R 21/232; B60R 21/233; B60R 2021/23192; B60R 2021/23324
See application file for complete search history.

(56) References Cited

U.S. PATENT DOCUMENTS

| 6,073,961 | A  | * | 6/2000  | Bailey ................ B60R 21/2338 280/730.2 |
| 6,123,355 | A  | * | 9/2000  | Sutherland ............ B60R 21/232 280/736 |
| 6,457,740 | B1 | * | 10/2002 | Vaidyaraman ........ B60R 21/232 280/730.2 |
| 2001/0048215 | A1 | * | 12/2001 | Breed .................. B60N 2/0276 280/728.1 |
| 2002/0074778 | A1 | * | 6/2002  | Melia .................... B60R 21/213 280/730.2 |
| 2002/0101067 | A1 | * | 8/2002  | Breed ................... B60R 21/214 280/741 |
| 2010/0133797 | A1 | * | 6/2010  | Kim ..................... B60R 21/214 280/743.2 |
| 2010/0327567 | A1 | * | 12/2010 | Choi ................... B60R 21/2176 280/730.2 |
| 2011/0012417 | A1 | * | 1/2011  | Vlahovic ................ B60R 21/04 297/452.38 |
| 2016/0176378 | A1 | * | 6/2016  | Thomas, Jr. ........ B60R 13/0212 280/730.2 |
| 2017/0072895 | A1 | * | 3/2017  | Nedelman ......... B60R 21/23138 |
| 2018/0037188 | A1 | * | 2/2018  | Ohno .................... B60R 21/232 |
| 2018/0215338 | A1 | * | 8/2018  | Faruque ................ B60R 21/264 |
| 2019/0106073 | A1 | * | 4/2019  | Sundararajan ...... B60R 21/2338 |
| 2020/0391689 | A1 | * | 12/2020 | Fischer ................. B60R 21/214 |

* cited by examiner

*Primary Examiner* — Karen Beck
(74) *Attorney, Agent, or Firm* — NovoTechIP International PLLC

(57) ABSTRACT

According to an embodiment of the present disclosure, a roof airbag may include a first cushion installed between a vehicle roof and a headliner, and a second cushion connected to one surface of the first cushion and deployed downward from the headliner to obstruct a front of a passenger as a gas is supplied from the first cushion, and an opening may be formed and provided in the headliner for the second cushion to pass therethrough and be deployed.

10 Claims, 5 Drawing Sheets

ROOF AIRBAG AND ROOF AIRBAG DEVICE HAVING THE SAME

CROSS-REFERENCE TO RELATED APPLICATIONS

This application claims priority to and the benefit of Korean Patent Application No. 10-2022-0084770, filed on Jul. 11, 2022, in the Korean Intellectual Property Office, the entire disclosure of which is incorporated herein by reference for all purposes.

TECHNICAL FIELD

The present disclosure relates to a roof airbag and a roof airbag device having the same, and more particularly, to a roof airbag deployed from a roof of a vehicle toward a passenger and a roof airbag device having the same.

BACKGROUND

Various types of airbag devices are provided in a vehicle as a measure to safely protect a vehicle passenger. Among the airbag devices, a roof airbag device is a device mounted on a roof panel of the vehicle and an airbag cushion is deployed downward in case of an accident to protect the passenger.

Recently, the development of smart vehicles combined with autonomous driving technology, such as electric vehicles is progressing rapidly, and the necessity of a roof airbag device is increasing due to the application of a slim cockpit structure.

However, since an existing roof airbag device should cover the whole empty space from the rear of a windshield to a passenger in order for an airbag to have rigidity enough to support the passenger, the airbag should have a large capacity, which causes many disadvantages in deployment performance, packaging, and the like.

SUMMARY

The present disclosure is directed to providing a roof airbag capable of reducing the capacity of an airbag, enhancing deployment performance through improved packaging, and effectively protecting a passenger, and a roof airbag device having the same.

The objects of the present disclosure are not limited to the above-mentioned objects, and other objects not mentioned will be clearly understood by those skilled in the art from the following description.

According to an aspect of the present disclosure, there is provided a roof airbag including: a first cushion installed between a vehicle roof and a headliner; and a second cushion connected to one surface of the first cushion and deployed downward from the headliner to obstruct a front of a passenger as a gas is supplied from the first cushion, and an opening may be formed and provided in the headliner for the second cushion to pass therethrough and be deployed.

The first cushion may be disposed in a structure extending in a width direction of a vehicle, and the one surface connected to the second cushion may be equipped with a flow hole through which the gas flows.

The second cushion may be expanded in the headliner in a fan shape from the one surface of the first cushion and deployed downward toward the passenger.

The second cushion may include a plurality of connection cushions connected to the one surface of the first cushion and stacked in a vertical direction.

The gas may flow from the first cushion into a connection cushion disposed adjacent to the vehicle roof among the plurality of connection cushions, and the plurality of connection cushions may be configured to be sequentially expanded when the gas is supplied to the other connection cushions that are sequentially stacked adjacent to each other.

The plurality of connection cushions may be partitioned from each other through inner diaphragms provided therein, and a vent hole, through which the gas flows, may be formed in each of the inner diaphragms.

The connection cushions may have a structure whose thickness increases from a fixed end connected to the first cushion to a free end in an expanded state.

Among the plurality of connection cushions, a soft foam headliner may be attached to a surface disposed on the opening of the headliner and exposed through the opening, and the soft foam headliner may have a shape fitted into the opening.

The roof airbag may further include a tether restraining the plurality of connection cushions to be maintained in a folded and stacked state, and the tether may be configured to be cut as the connection cushions are expanded so that the plurality of connection cushions are deployed.

According to another aspect of the present disclosure, there is provided a roof airbag device installed between a vehicle roof and a headliner, including: a housing mounted on the vehicle roof; an inflator accommodated in the housing and generating a gas; and a roof airbag including a first cushion accommodated in the housing and connected to the inflator and a second cushion connected to one surface of the first cushion and deployed downward from the headliner to obstruct the front of a passenger as the gas is supplied from the first cushion, and an opening may be formed and provided in the headliner for the second cushion to pass therethrough and be deployed.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, wherein identical or corresponding components will be assigned the same reference numerals regardless of drawing numbers, and duplicate descriptions thereof will be omitted.

Figure 1:
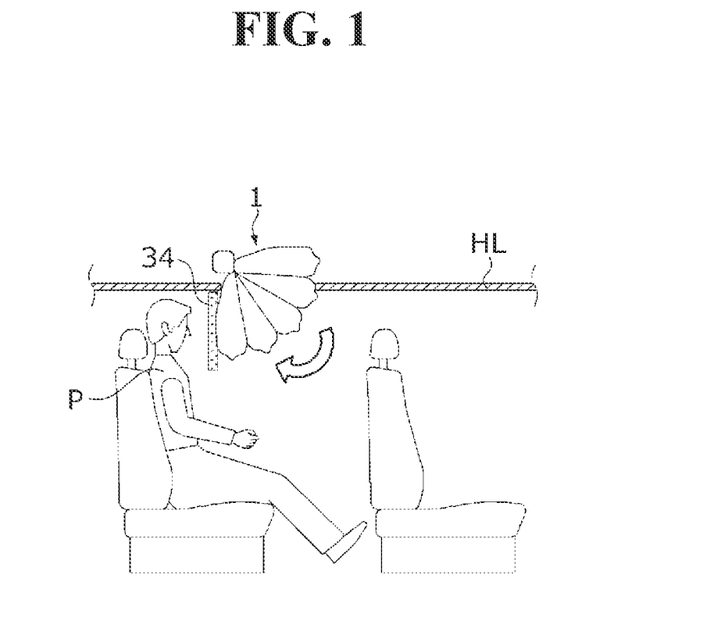
FIG. 1 is a view schematically illustrating a state in which a roof airbag device according to an embodiment of the present disclosure is deployed above a second row.
Figure 2:
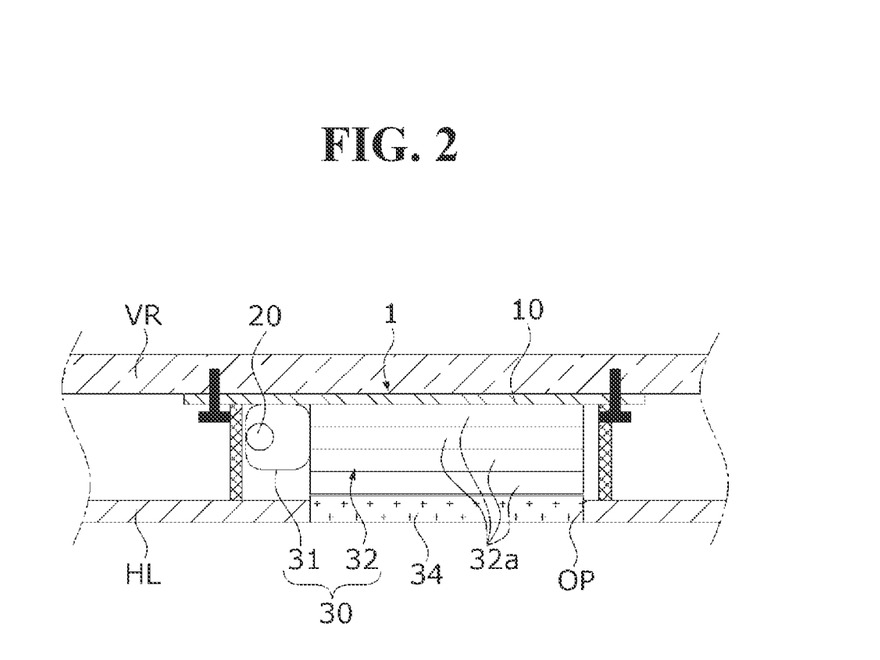
FIG. 2 is a view schematically illustrating a state in which the roof airbag device according to the embodiment of the present disclosure is installed on a vehicle roof above the second row.
Figure 3:
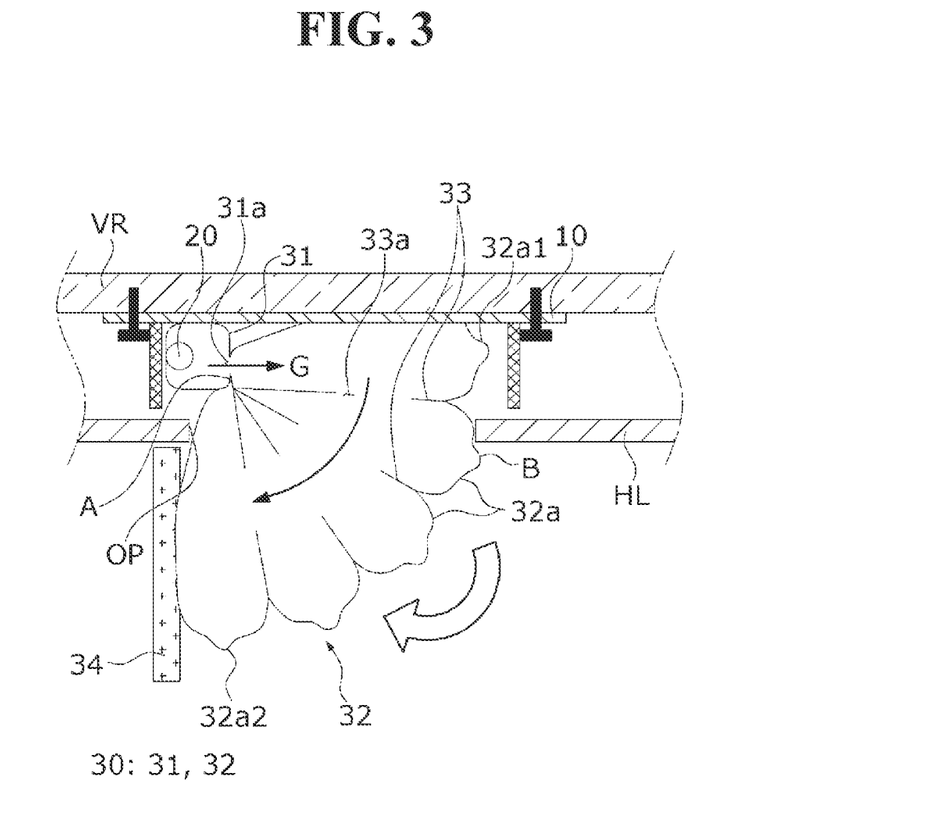
FIG. 3 is a view schematically illustrating a state in which the roof airbag device of FIG. 2 is deployed.

FIG. 1 is a view schematically illustrating a state in which a roof airbag device according to an embodiment of the present disclosure is deployed above a second row, FIG. 2 is a view schematically illustrating a state in which the roof airbag device according to the embodiment of the present disclosure is disposed at (e.g., installed on) a vehicle roof above the second row, and FIG. 3 is a view schematically illustrating a state in which the roof airbag device of FIG. 2 is deployed.

A roof airbag device 1 according to an embodiment of the present disclosure may be installed between a vehicle roof VR and a headliner HL and deployed downwardly toward a passenger P in case of a collision accident to protect the passenger P.

In FIG. 1, the roof airbag device 1 is exemplified to be installed above a second row to protect the passenger P in the rear seat.

Referring to the drawings, the roof airbag device 1 according to the embodiment of the present disclosure may include a housing 10, an inflator 20, and a roof airbag 30.

The housing 10 may be detachably mounted on the vehicle roof VR and accommodate and fix the inflator 20 and the roof airbag 30 so that the inflator 20 and the roof airbag 30 are disposed between the vehicle roof VR and the headliner HL.

In the embodiment, the housing 10 may have a structure with a box shape opened toward the headliner HL located below, when mounted on the vehicle roof VR. In this case, an opening OP for deployment of the roof airbag 30 to be described below may be formed and provided in the headliner HL. In addition, in response to a location of the opening OP formed in the headliner HL, the housing 10 may be disposed in a structure facing the opening OP.

The housing 10 may be made of a material with rigidity, for example, a metal but is not limited thereto.

The inflator 20 may be installed and supported inside the housing 10.

The inflator 20 may be configured to generate a gas G according to a signal of an airbag controller (ACU) (not shown) when a vehicle collision accident occurs.

The inflator 20 may be formed in a round rod shape, and a gas generant, an ignition device, and the like may be embedded therein. In the embodiment, the inflator 20 may be provided as a cylinder type inflator equipped with an outlet for discharging the gas at one end.

In the present embodiment, the inflator 20 is exemplified to be disposed in a structure extending in a width direction of a vehicle but is not limited thereto.

The roof airbag 30 may be configured to be deployed toward the passenger P while being expanded when the gas G discharged from the inflator 20 flows in.

As shown in the drawings, the roof airbag 30 may include a first cushion 31 connected to the inflator 20 and a second cushion 32 connected to the first cushion 31.

The first cushion 31 may be made of a fabric material with flexibility, and installed in the housing 10 and disposed in a structure extending in the width direction of the vehicle between the vehicle roof VR and the headliner HL.

Figure 4A:
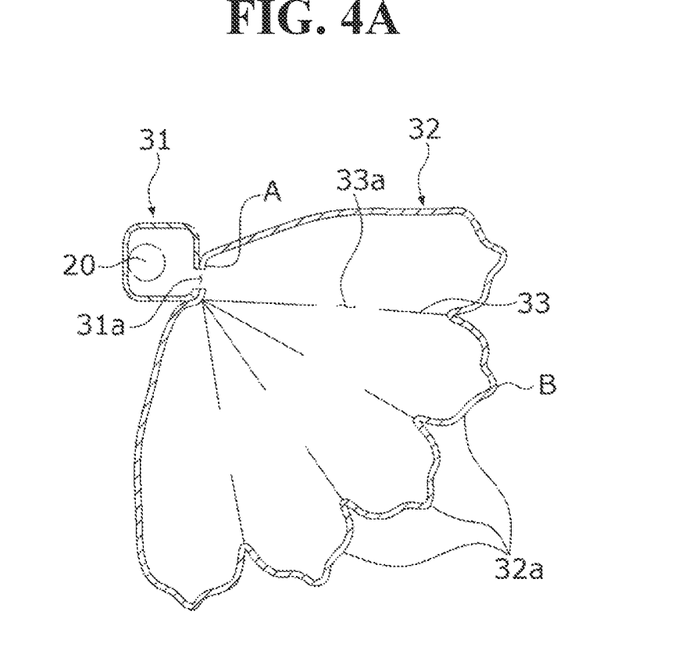
FIGS. 4A and 4B are views illustrating mounting locations of an inflator in the roof airbag device.
Figure 4B:
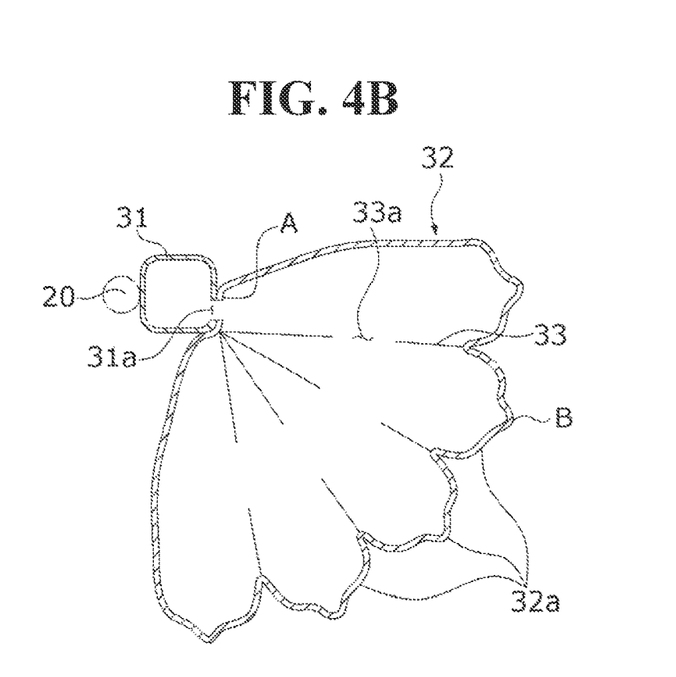

As shown in FIG. 4A, the first cushion 31 may be configured to accommodate the inflator 20 so that the gas G is discharged within the first cushion 31. Of course, as shown in FIG. 4B, the first cushion 31 may also be configured to be connected to the inflator 20 disposed outside and receive the gas G.

The second cushion 32 may be connected to one surface of the first cushion 31. In this case, the one surface may correspond to a surface directed to the front of the vehicle when the first cushion 31 extends in the width direction of the vehicle.

A flow hole 31a, through which the gas G flows, may be provided on the one surface of the first cushion 31. In addition, the gas G may be supplied from the first cushion 31 to the second cushion 32 through the flow hole 31a.

Like the first cushion 31, the second cushion 32 may be made of a fabric material with flexibility, and deployed downwardly from the headliner HL to cover or obstruct the front of the passenger P while being expanded as the gas G is supplied from the first cushion 31.

In the embodiment, the second cushion 32 may pass through the opening OP formed in the headliner HL and be deployed. As the second cushion 32 is deployed, the upper body of the passenger P may be covered or obstructed by the second cushion 32 and prevented from moving forward.

As shown in the drawings, the second cushion 32 may be configured to be deployed downwardly toward the passenger P while expanding in the headliner HL in a fan shape from the one surface of the first cushion 31.

In the embodiment, the second cushion 32 may include a plurality of connection cushions 32a connected to the one surface of the first cushion 31 and stacked in a vertical direction.

Each of the connection cushions 32a may have substantially the same shape, and the plurality of connection cushions 32a may be partitioned from each other through inner diaphragms 33 provided therein. That is, the second cushion 32 may be partitioned into the plurality of connection cushions 32a with individual inner spaces through the inner diaphragms 33. Thus, since the second cushion 32 has a plurality of inner spaces partitioned by stacking the plurality of connection cushions 32a with respective inner spaces, the effect of an improved supporting force may be expected as compared to a structure with a single inner space.

A vent hole 33a, through which the gas G flows, may be formed in each of the inner diaphragms 33. The gas G may flow to another adjacent connection cushion 32a through the vent hole 33a.

The gas G may flow from the first cushion 31 into a connection cushion 32a disposed adjacent to the vehicle roof VR among the plurality of connection cushions 32a constituting the second cushion 32. In addition, the gas G is supplied through the vent hole 33a to the other connection cushions 32a that are sequentially stacked adjacent to each other so that the plurality of connection cushions 32a may be configured to be sequentially expanded.

That is, only the connection cushion 32a disposed uppermost in the drawing may have a structure communicating with the flow hole 31a and be connected to the one surface of the first cushion 31. The remaining connection cushions 32a may be connected to a portion in which the flow hole 31a is not formed at one surface. Accordingly, the gas G may be supplied from the first cushion 31 to the connection cushion 32a disposed uppermost and connected through the flow hole 31a and then supplied to the remaining connection cushions 32a stacked in sequence.

As shown in the drawings, the connection cushions 32a may have a structure whose thickness increases from a fixed end A connected to the first cushion 31 toward a free end B in an expanded state. Accordingly, the second cushion 32 may be deployed in an overall fan shape.

Among the plurality of connection cushions 32a, an uppermost connection cushion 32a1 disposed uppermost and expanded first may be deployed and contact the vehicle roof VR, and a lowest connection cushion 32a2 disposed lowermost and expanded last may be deployed in a fan shape and contact the upper body of the passenger P in front of the passenger P.

Accordingly, when a load of the passenger P is applied to the lowermost connection cushion 32a2, the fixed end A of the plurality of connection cushions 32a may be supported by the first cushion 31, and the free end B of the plurality of connection cushions 32a may be supported by a reaction force of the uppermost connection cushion 32a1 contacting the vehicle roof VR. Accordingly, since the passenger P may be sufficiently prevented from moving forward in the vehicle due to the second cushion 32 moved by the load of the passenger P, the passenger P may be protected. In addition, even when the position of a seat is changed forward or backward or the seat is turned, the passenger P may be sufficiently protected irrespective of the position or state of the seat, and even when the installation freedom of the seat is increased, the protection performance of the passenger P may be prevented from being degraded.

As shown in the drawings, among the plurality of connection cushions 32a, a soft foam headliner 34 may be attached to a surface disposed on the opening OP of the headliner HL and exposed through the opening OP. In the embodiment, the soft foam headliner 34 may be attached to a lower surface of the lowermost connection cushion 32a2. In this case, the soft foam headliner 34 may have a shape fitted into the opening OP. In addition, in a state in which the housing 10 is installed on the vehicle roof VR, a surface of the soft foam headliner 34 mounted inside the housing 10 may be disposed at substantially the same level as a surface of the headliner HL.

As the second cushion 32 is deployed, the soft foam headliner 34 attached to the lowermost connection cushion 32a2 contacts the upper body of the passenger P. Accordingly, it is desirable that the soft foam headliner 34 should be made of a material with softness capable of absorbing the load of the passenger P and minimizing an impact on the passenger P.

Figure 5:
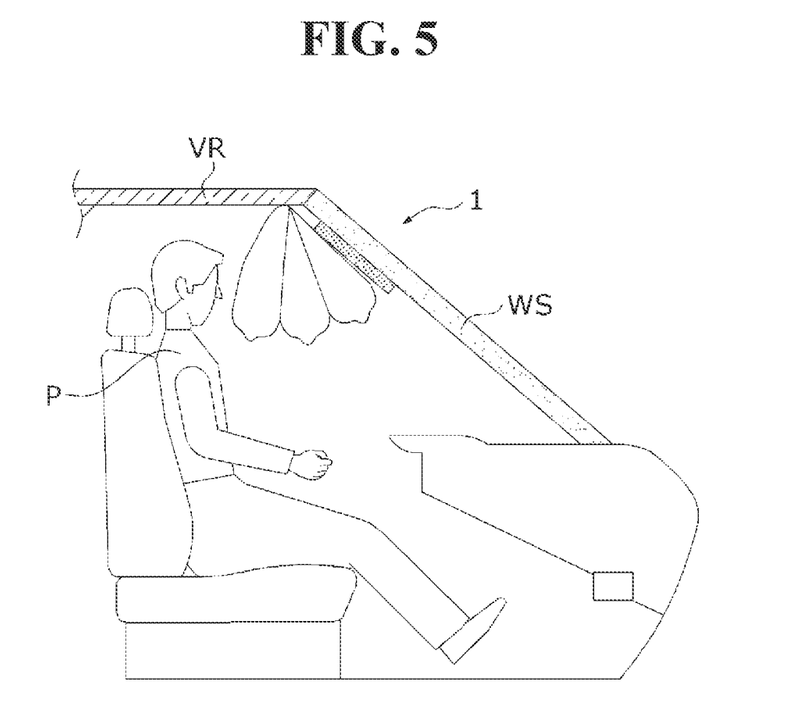
FIG. 5 is a view schematically illustrating a state in which the roof airbag device according to the embodiment of the present disclosure is deployed above a first row.

In FIG. 5, the roof airbag device 1 is exemplified to be installed above a passenger seat of a first row to protect the passenger P in the front seat.

Figure 6:
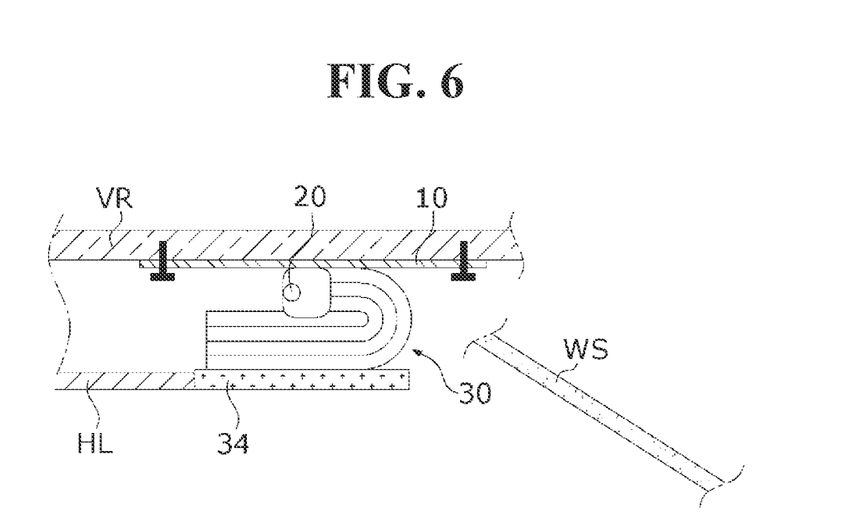
FIG. 6 is a view schematically illustrating a state in which the roof airbag device according to the embodiment of the present disclosure is installed on the vehicle roof above the first row.
Figure 7:
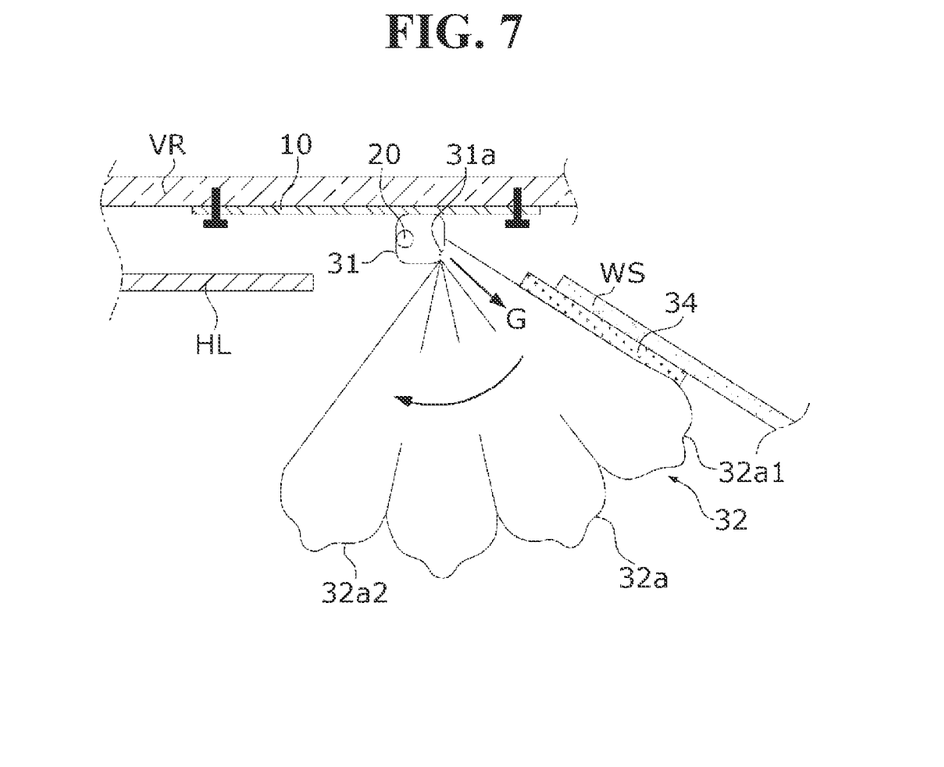
FIG. 7 is a view schematically illustrating a state in which the roof airbag device of FIG. 6 is deployed.

FIG. 5 is a view schematically illustrating a state in which the roof airbag device according to the embodiment of the present disclosure is deployed above the first row, FIG. 6 is a view schematically illustrating a state in which the roof airbag device according to the embodiment of the present disclosure is installed in the vehicle roof above the first row, and FIG. 7 is a view schematically illustrating a state in which the roof airbag device of FIG. 6 is deployed.

As shown in the drawings, the roof airbag device 1 may be installed between the vehicle roof VR and the headliner HL behind a windshield WS.

The second cushion 32 may be provided in a structure folded in a 180-degree opposite direction while the plurality of connection cushions 32a are stacked. That is, unlike the plurality of connection cushions 32a connected to one surface of the first cushion 31 and provided in a structure extending forward in a stacked state as shown in FIG. 2, when protecting the front seat passenger P, the plurality of connection cushions 32a may be folded in the 180-degree opposite direction and provided in a structure extending backward.

Accordingly, the plurality of connection cushions 32a may be in a reversed state, the uppermost connection cushion 32a1 may be disposed to face the headliner HL, and the lowermost connection cushion 32a1 may be disposed to face the vehicle roof VR.

In addition, among the plurality of connection cushions 32a, the soft foam headliner 34 may be attached to a surface disposed on the opening OP of the headliner HL and exposed through the opening OP. In the embodiment, the soft foam headliner 34 may be attached to a surface of the uppermost connection cushion 32a1 facing the headliner HL. In this case, the soft foam headliner 34 may have a shape fitted into the opening OP. In addition, in a state in which the housing 10 is installed on the vehicle roof VR, a surface of the soft foam headliner 34 mounted inside the housing 10 may be disposed at substantially the same level as a surface of the headliner HL.

As the second cushion 32 is deployed, the uppermost connection cushion 32a1 is first expanded by the gas G supplied from the first cushion 31 and is unfolded from a folded state toward the front of the vehicle, and thus the soft foam headliner 34 is deployed to contact the back of the windshield WS. In addition, the remaining connection cushions 32a may be expanded, unfolded, and deployed in sequence, and the lowermost connection cushion 32a2 may be finally deployed in a fan shape toward the front of the passenger P.

Accordingly, when a load of the passenger P is applied to the lowermost connection cushion 32a2, the fixed end A of the plurality of connection cushions 32a may be supported by the first cushion 31, and the free end B of the plurality of connection cushions 32a may be supported by a reaction force of the uppermost connection cushion 32a1 contacting the windshield WS. Accordingly, since the passenger P may be sufficiently prevented from moving forward in the vehicle due to the second cushion 32 moved by the load of the passenger P, the passenger P may be protected.

Figure 8:
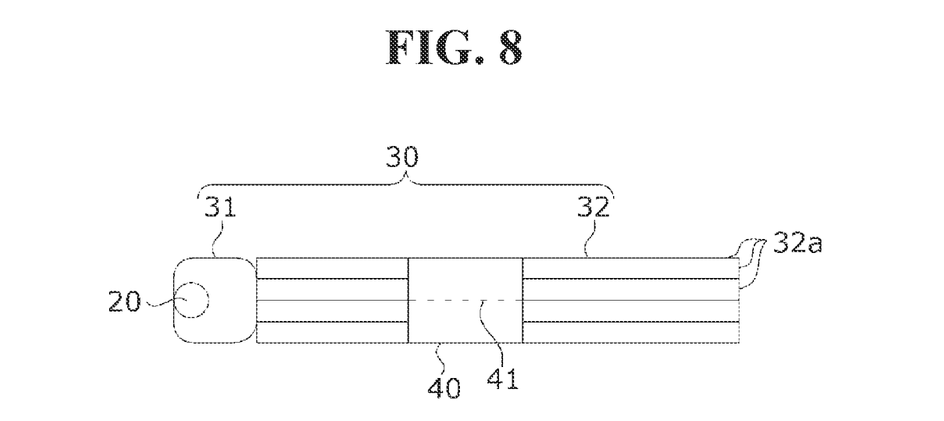
FIG. 8 is a view schematically illustrating the roof airbag device according to a modified embodiment of the present disclosure.

FIG. 8 schematically illustrates a modified example of the roof airbag device 1.

As shown in FIG. 8, the second cushion 32 may be equipped with a tether 40 restraining the plurality of connection cushions 32a to be maintained in a folded and stacked state.

The tether 40 is provided to restrain the plurality of connection cushions 32a by being connected to side portions of the plurality of connection cushions 32a, and the second cushion 32 may be mounted in the housing 10 together with the first cushion 31 while maintaining a state in which the plurality of connection cushions 32a are stacked.

The tether 40 is configured to be cut when the gas G is supplied due to occurrence of a collision accident and the connection cushions 32a are expanded, and thus the plurality of connection cushions 32a may be deployed in a fan shape. In one embodiment, a cutting line 41 for easy cutting may be formed in the tether 40.

In the present embodiment, the plurality of connection cushions 32a are exemplified to be restrained through the tether 40 but are not limited thereto. For example, the plurality of connection cushions may be configured to be restrained using a tape made of a paper material or the like.

As described above, according to the present embodiment, since the plurality of connection cushions 32a constituting the second cushion 32 of the roof airbag 30 are expanded from the stacked state and deployed in a fan shape for the first cushion 31, the empty space from the back of the windshield WS to the passenger P may be all covered, and thus the passenger P may be safely protected.

Particularly, since the plurality of connection cushions 32a connected in a mutually stacked structure are configured to be deployed in a fan shape, a large airbag with a large capacity is not needed, and there is an advantage in that deployment performance is improved and efficient packaging is possible through packaging in which the plurality of connection cushions 32a are simply stacked instead of a conventional method of folding a large-capacity airbag in multiple stages by complicatedly folding the large-capacity airbag.

According to an embodiment of the present disclosure, it is possible to provide a roof airbag capable of reducing the capacity of an airbag, enhancing deployment performance through improved packaging, and effectively protecting a passenger, and a roof airbag device having the same.

The effects of the present disclosure are not limited to the above-mentioned effects, and other effects not mentioned will be clearly understood by those skilled in the art from the appended claims.

It will be apparent to those skilled in the art that various modifications can be made to the above-described exemplary embodiments of the present disclosure without departing from the spirit or scope of the invention. Thus, it is intended that the present disclosure covers all such modifications provided they come within the scope of the appended claims and their equivalents.

What is claimed is:

1. A roof airbag stored folded between a vehicle roof and a headliner of a vehicle, the roof airbag comprising:
    a first cushion configured to stay between the vehicle roof and the headliner when supplied with a gas; and
    a second cushion connected to the first cushion and configured to deploy downwardly from the headliner to cover a front of a passenger when supplied with the gas from the first cushion,
    wherein the headliner has an opening, and the second cushion is configured to pass through the opening of the headliner when deployed downwardly from the headliner,
    wherein the first cushion includes a surface having a flow hole, and the second cushion is connected to the surface of the first cushion such that inner spaces of the first and second cushions are connected to each other via the flow hole through which the gas is supplied from the first cushion to the second cushion, and
    wherein the first cushion is configured such that the first cushion in its entirety, including the flow hole, stays between the vehicle roof and the headliner when the first and second cushions are fully inflated.

2. The roof airbag of claim 1, wherein the first cushion is disposed in a structure extending in a width direction of the vehicle.

3. The roof airbag of claim 1, wherein the second cushion is configured to expand in a fan shape from the surface of the first cushion when supplied with the gas.

4. The roof airbag of claim 3, wherein the second cushion includes a plurality of connection cushions connected to the surface of the first cushion and stacked vertically.

5. The roof airbag of claim 4, wherein:
the plurality of connection cushions includes (1) a first connection cushion disposed adjacent to the vehicle roof and (2) a plurality of second connection cushions disposed further away from the vehicle roof than the first connection cushion,
the gas is supplied from the first cushion into the first connection cushion, and
the plurality of connection cushions are configured to expand sequentially when the gas is supplied to the plurality of second connection cushions stacked vertically.

6. The roof airbag of claim 4, wherein:
the second cushion includes a plurality of inner diaphragms configured to partition the second cushion into the plurality of connection cushions, and
each inner diaphragm has a vent hole.

7. The roof airbag of claim 4, wherein:
each of the plurality of connection cushions has a first end connected to the first cushion and a second end, and
a thickness of each connection cushion increases from the first end to the second end when expanded.

8. The roof airbag of claim 4, wherein:
among the plurality of connection cushions, a soft foam headliner is attached to a surface disposed on the opening of the headliner and exposed through the opening, and
the soft foam headliner has a shape fitted into the opening.

9. The roof airbag of claim 4, further comprising a tether configured to maintain the plurality of connection cushions folded and stacked, and configured to be cut when the plurality of connection cushions are expanded and deployed.

10. A roof airbag device of a vehicle including a vehicle roof and a headliner, comprising:
a housing positioned between the vehicle roof and the headliner;
an inflator disposed at the housing and configured to supply a gas; and
a roof airbag stored folded at the housing and configured to inflate when supplied with the gas from the inflator, the roof airbag including:
a first cushion connected to the inflator and configured to inflate when supplied with the gas from the inflator; and
a second cushion connected to a surface of the first cushion and configured to deploy downwardly from the headliner to cover a front of a passenger when the gas is supplied from the first cushion,
wherein the headliner has an opening and the second cushion is configured to pass through the opening when deployed downwardly from the headliner,
wherein the first cushion includes a surface having a flow hole, and the second cushion is connected to the surface of the first cushion such that inner spaces of the first and second cushions are connected to each other via the flow hole through which the gas is supplied from the first cushion to the second cushion, and
wherein the first cushion is configured such that the first cushion and its entirety, including the flow hole, stays between the vehicle roof and the headliner when the first and second cushions are fully inflated.

* * * * *